United States Patent Office 2,834,273
Patented May 13, 1958

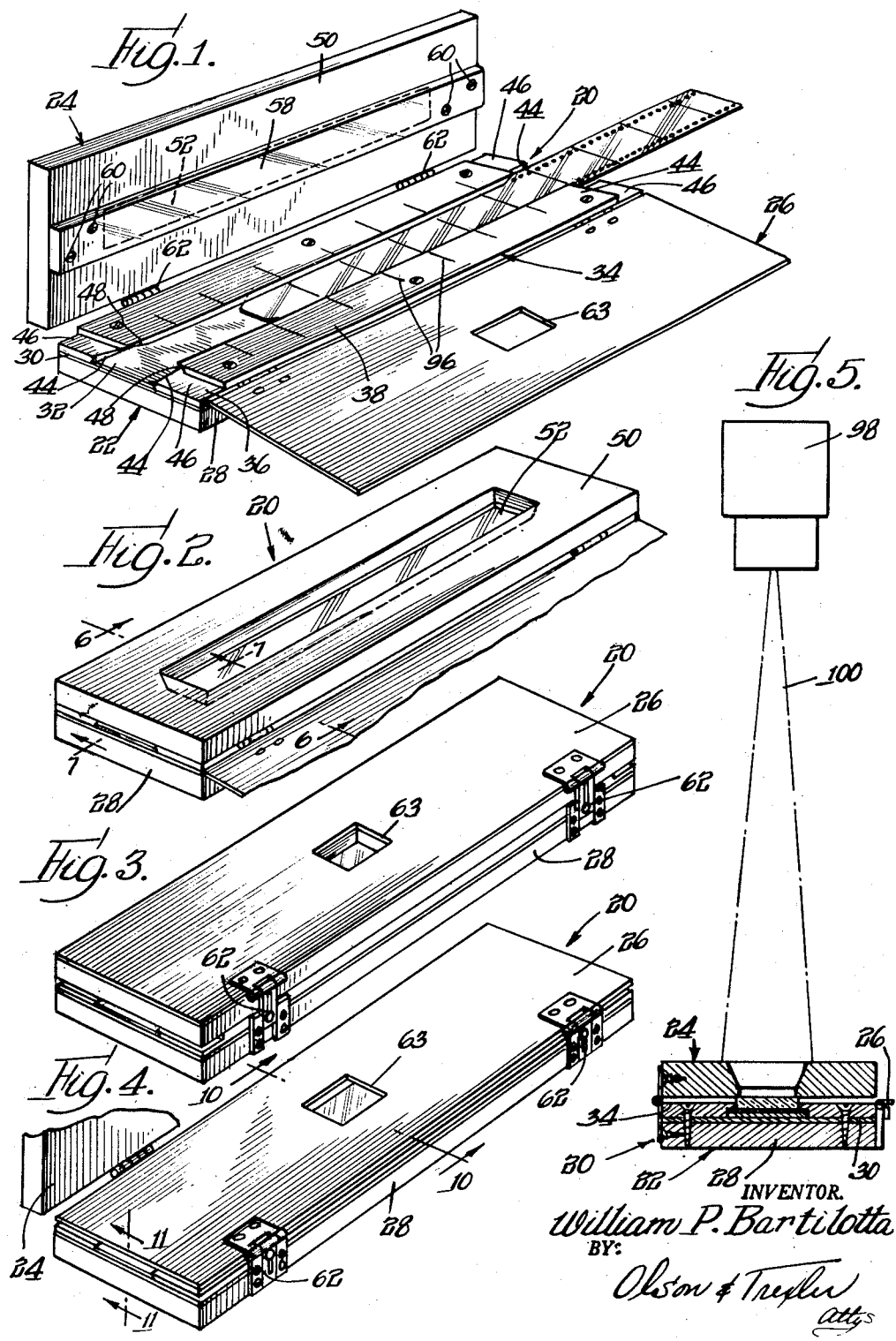

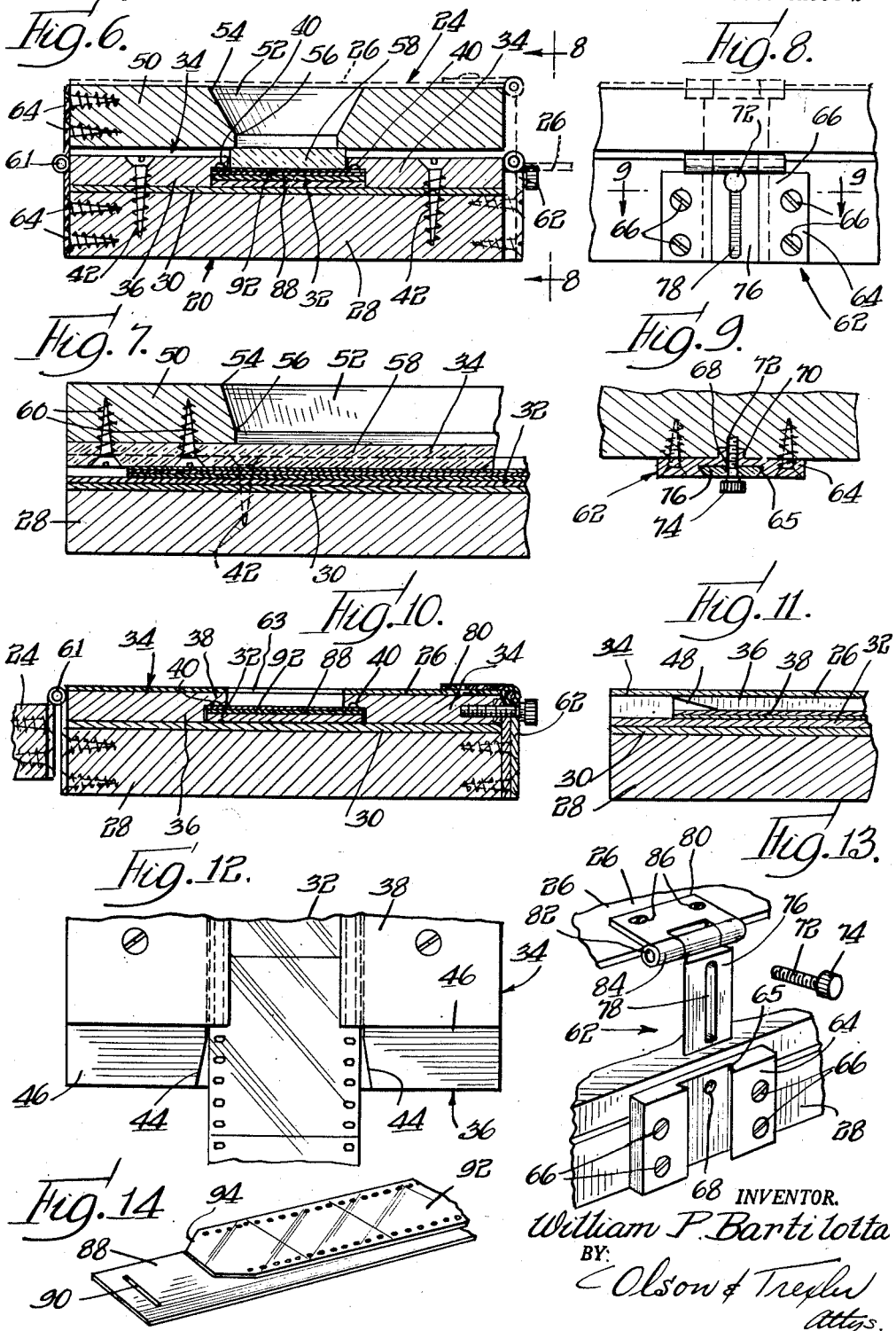

2,834,273

PHOTOGRAPHIC PRINTING DEVICE

William P. Bartilotta, Chicago, Ill.

Application April 18, 1955, Serial No. 502,011

5 Claims. (Cl. 95—77)

This invention is concerned generally with the photographic arts, and more particularly with a printing frame or device.

Some of the best and most versatile cameras available to day are in the miniature size range. A great many of these cameras utilize perforated 35 mm. film. The negatives made on such film are slightly less than one inch by one and one-half inches in dimension. Such negatives must be enlarged in printing in order to obtain prints of reasonable size. However, the making of enlarged prints is expensive as compared with contact prints. Many people do not want to have all of the prints enlarged, but would prefer to have inexpensive contact prints made so that these prints could be studied carefully to determine which negatives should be utilized in making enlarged prints. Many times it is desirable to print a large number of exposures from a 35 mm. film on a single strip of printing paper. At other times, it is desirable to print only selected negatives on a strip of film. At still other times, it is desirable to enlarge only a relatively small portion of a 35 mm. negative in making a small print of contact size, or in making positive prints on film for projection. It will be understood that strip prints or selected prints also could be made on film for projection of positives.

It is an object of this invention to provide a printing frame or device capable of fulfilling the functions outlined above.

More specifically, it is an object of this invention to provide an improved printing frame or device for producing strip prints from 35 mm. film or the like upon a strip of printing paper or film.

It is a further object of this invention to provide a strip film printing device insuring intimate contact of the negative film with the paper or film being printed on throughout the entire extent of the printing area to preclude distortion in printing.

Another object of this invention is to provide a printing frame or device having means for holding the paper or film to be printed upon, and also at times holding a strip of negative film, which holding means is adapted for ready insertion of the paper or film.

It is a further object of this invention to provide a printing frame or device as contemplated by the foregoing objects which is of simple and rugged construction and which is economical and simple to fabricate.

Other and further objects and advantages will be apparent from the following description when taken in connection with the accompanying drawings, wherein:

Fig. 1 is a perspective view of the device in open position for receiving a strip of film or the like;

Fig. 2 is a perspective view of the device in position for printing a strip of exposures;

Fig. 3 is a perspective view of the device in position for printing selected negatives on a strip of paper or film;

Fig. 4 is a perspective view showing the device in position for printing an enlarged portion of a negative to contact print size;

Fig. 5 is a cross sectional view of the device in printing position in accordance with Fig. 2 and showing a projection light in cooperation therewith;

Fig. 6 is an enlarged cross sectional view along the line 6—6 in Fig. 2;

Fig. 7 is fragmentary longitudinal sectional view on an enlarger scale taken along the line 7—7 in Fig. 2;

Fig. 8 is a side view of one of the hinges holding certain of the parts together as taken substantially along the line 8—8 in Fig. 6;

Fig. 9 is a horizontal sectional view through the hinge as taken along the line 9—9 in Fig. 8;

Fig. 10 is an enlarged cross sectional view along the line 10—10 in Fig. 4;

Fig. 11 is a fragmentary longitudinal view on an enlarged scale taken along the line 11—11 in Fig. 4;

Fig. 12 is a fragmentary plan view showing the insertion of a film strip into the printing device;

Fig. 13 is an exploded perspective view of the hinge construction; and

Fig. 14 is a perspective view showing a film and its cooperation with a preferred form of insertion mat.

Referring now in greater particularity to the drawings, and first to Fig. 1, there will be seen a printing device generally identified by the numeral 20 comprised of three basic parts, a holder 22, a platen 24 and a mask 26. The holder 22, as may be seen also in Figs. 6, 7, 10 and 11, comprises a base 28 in the form of a block of wood of substantial rigidity. A bed 30 of black material is secured to the top of the wood base 28. For best adherence to parts hereinafter to be described, the black material or sheet 30 preferably is formed of methyl methacrylate, commonly known as "Plexiglas." The bed 30 preferably is secured to the base 28 by means of screws hereinafter to be described.

A backing plate or strip 32 slightly wider than a strip of 35 mm. film is mounted on top of the bed 30 along the central axis thereof. The backing plate 32 conveniently is made of clear "Plexiglas," and it is secured to the bed 30 by a plastic cement of the type commonly used for cementing sheets of this material together.

A pair of identical guides 34 is mounted on each side of the backing plate 32. Each guide 34 is of integral construction and includes a spacer portion 36 butting against the edge of the backing plate 32, and a plate or retainer portion 38 overlying the backing plate 32 but spaced therefrom by substantially one-sixteenth inch. It is of importance that the spacer portion 36 and the plate, shelf or retainer portion 38 are of integral construction to avoid any joint between them into which a sharp corner or edge of the film might project and snag. It will be observed in Fig. 6 that the projecting shelf edges are provided with longitudinally extending, generally semi-circular grooves or recesses 40 to hold friction with film or paper to a minimum. The guides 34 are preferably made of "Plexiglas" and are cemented to the bed 30. Screws 42 are countersunk into the top of the guides and project through the bed and are screwed into the wooden base 28 to secure the guides, bed and backing plate to the base.

As will be seen in Figs. 1 and 12, the spacer portion 36 of each guide 34 is beveled at its inner ends as is indicated at 44 to facilitate entrance of a strip of film into the space between the guides. Furthermore, the shelf portion terminates short of each end of the spacer portion to provide a small plateau 46 at each end of the guide further to facilitate insertion of a film between the guides and under the shelf portions thereof.

The bottom corners of the shelf portions 38 are undercut or beveled at 48 as may be observed in Figs. 1 and 11 further to facilitate insertion of a strip of film or paper.

The platen 24 previously referred to comprises a block or board 50 of wood of substantially the same size as the base 28. The block includes a central slot or aperture 52 extending substantially from end to end of the board 50 and tapering from a maximum dimension at 54 at the top of the board to a minimum dimension at 56 adjacent the bottom of the board. The minimum width of the slot 52 as at 56 is slightly less than the space between the confronting edges of the shelf portions 38 of the guides 34.

A strip of transparent material, preferably "Plexiglas," extends from end to end of the platen as is indicated at 58 and underlies the slot 52. The strip of "Plexiglas" 58 is slightly wider than the minimum width 56 of the slot and is secured to the ends of the board 50 by means of screws 60 which are countersunk into the strip 58. The strip 58, as previously has been noted, is slightly wider than the minimum width of the slot 52, and as may be seen in Fig. 6 the width of this strip is sufficient to fit snugly between the confronting edges of the shelf portions 38 of the guide. The board 50 of the platen 24 is secured to the base 28 by a pair of hinges 61 relatively toward the opposite ends thereof. These hinges are secured to the base and to the board by means such as screws 64. The size of the hinges and the positioning thereof on the base and on the platen is such that the transparent strip 58 will lie flat against the top of a strip of film between the guides with the board 50 spaced slightly above the guides 34 so that the full weight of the platen will rest on the film or paper to hold it flat.

The mask 26 previously referred to comprises an opaque sheet of metal such as aluminum, or of plastic such as the "Plexiglas" previously referred to. The sheet is provided at its center with an aperture 63 which is substantially the size of a 35 mm. double frame negative, or just slightly smaller than the size of such a negative. The mask 26 is hingedly connected to the base 28 by means of hinges 62. The hinges 62 as best may be seen in Figs. 8, 9, 10 and 13 are slip hinges so that the mask can be folded into position flat on top of the guides 34, or on top of the platen 24, or it may be folded away from the guides and platen as is shown in Figs. 1 and 2.

The specific construction of the split hinges may vary somewhat. One satisfactory construction is shown in the aforesaid figures and comprises a base 64 having a dovetailed or otherwise undercut slot or groove 65 therein. The base 64 of the hinge is held to the printing device base 28 by means of a plurality of countersunk screws 66. The back of the base 64 is provided near the top thereof and along the center line of groove 65 with a threaded aperture 68. The back may be provided on its rear surface with a protuberance 70 into which the threaded aperture extends in order to provide more threads for engagement by a locking screw 72 having a knurled head 74 for finger adjustment.

The hinge 62 further includes a dovetailed slide 76 received in the groove or slideway 65. It will be understood that the slide would be complementary to the groove or slideway if some shape other than dovetailed were to be used. Slide 76 is provided with a longitudinal slot 78 through which the screw 72 projects. The slide obviously is movable vertically in the slideway and is limited in its vertical movement by the screw 72. Threading of the screw tightly into place clamps the slide in adjusted position. The slide 76 is pivotally connected to a hinge leaf 80 by means of a pivot pin 82 and conventional curled over ears 84 on the hinge leaf and on the slide 76. The hinge leaf 80 is secured to the upper surface of the mask 26 by suitable means such as bolts or screws 86 which preferably are countersunk in the plate forming the mask, and which may be threaded into the hinge leaf, or may be secured in place by nuts.

The printing device disclosed herein further is preferably provided with a mat 88 shown in Fig. 14, and having a transverse slot 90 near one end thereof. The mat is of the same width as a strip of film 92, and the cut down end 94 of the film is slipped into the slot 90 so that the film and mat may be slid into position between the guides 34 and beneath the shelf portions 36 thereof. The mat is provided with a dull black top to prevent reflections and preferably is made of a strip of cardboard or the like to provide a certain amount of resilience to hold the film tightly against the undersides of the shelf portions 36. It will be understood that a strip of paper of the contact printing type would be interposed between the film and the mat 88.

In order to preclude light reflections the wooden parts previously mentioned preferably would be finished with a dull black paint. The plastic and metal parts would be sand blasted or etched, and the mask 26 also could be provided with a dull black finish further to preclude reflections. The wooden parts previously mentioned also are of sufficient thickness relative to their transverse dimensions to preclude warping.

Transverse indicia or positioning lines 96 are provided on the tops of the guides 34 for aid in lining up the negatives on the film strip, and particularly for positioning a desired negative for alignment with the aperture 60 in the mat 26.

The printing frame or device herein shown and described can be used as is shown in Figs. 2, 5, 6 and 7 for making a strip of prints. For such use, the negative film is placed directly on top of a strip of printing paper and is placed in the proper position beneath the shelf portions of the guides. The platen is placed on top of the assembly so that the transparent strip 58 thereof presses down on the film to maintain the film in intimate contact with the printing paper. The device is positioned beneath a lamp 98 or other light source having the rays 100 thereof directed down onto the printing device in the vicinity of the slot to expose the printing paper so that it may be developed to produce a strip of positive prints. It will be understood that a strip of film could be used rather than the printing paper to provide positives for projection.

In some instances it may be desirable to produce contact prints of individual negatives. In this event the mask 26 is pivoted into position above the platen as is shown in Figs. 3, 10 and 11, and as indicated in dashed lines in Fig. 6. For thus positioning the mask the hinge slide 76 is moved well up in the slideway for providing a flat contact of the mat against the top of the platen. Although reference generally has been made to the sliding feature of the hinge, it will be apparent that if a large number of strips were to be printed, the hinges could be taken completely apart by removing the screws 72, and the mask thus could be removed from the printing device.

In still other instances it will be desirable to reduce large negatives to the size of a 35 mm. negative, either as a print on paper or on film, or as a negative on film. Likewise, it might occasionally be desirable to enlarge a portion of a 35 mm. negative to produce a print of such portion the size of a contact print of an entire negative. When it is desired to do any of these things, the platen 24 is hingedly moved away from the base to the position shown in Figs. 1 and 4, or preferably to the position shown in Fig. 10. The slide 76 is depressed well into the slideway 65, and the mask 26 is positioned directly on top of the guides 34. Before the mask is placed on top of the guides, the paper or film to be printed on is positioned on top of the backing plate beneath the shelf portions of the guides. The platen is dispensed with in this instance since the negative is placed in an enlarger and is spaced a considerable distance from the film. Thus, intimacy of contact is not desired. It will be understood that the enlarger would be positioned at substantially the position indicated for the light source 98. The enlarger could be of conventional design, and could be spaced from the printing frame or device the proper distance to provide either enlargement or reduction in accordance with the desired results.

It will be apparent that the structure heretofore shown and described is capable of wide use in producing photographic prints. The versatility by virtue of the hinged platen and the hinged or removable mask is considerable. The bevelled ends of the spacer portions of the guides, and the bevelled under corners of the shelf portions greatly facilitate insertion of a film strip into proper position for printing, and such positioning further is facilitated by the mat 88 which serves not only to position the film but also as a resilient backing to hold the film of paper tightly up against the underside of the shelf portions. The undercut grooves 40 of the shelf portions hold friction therewith to a minimum.

It will be understood that the specific form of the invention herein shown and described has been set forth by way of illustration. Various changes in structure will no doubt occur to those skilled in the art, and are to be understood as forming a part of the invention insofar as they fall within the spirit and scope of the appended claims.

The invention is claimed as follows:

1. A photographic printing device for a film strip of photosensitive material, and comprising a base having a longitudinal recess providing a film strip guideway, a platen having a longitudinal opening substantially coextensive with said guideway and moveable relative to the base to a position with the opening overlying the guideway and in alignment therewith, a section of transparent material on the underside of said platen and closing said opening and snugly fitting in said guideway when the platen is positioned with the opening overlying the guideway for holding an inserted film strip flat in the guideway, a mask of opaque material having an aperture positioned laterally symmetrically with respect to said guideway and said opening and of lesser longitudinal extent, and means removably connecting said mask to said base for movement thereof between operative and inoperative positions and including a mounting member for the mask shiftable relative to said base between a position in which said mask may be moved to parallel and directly overlie said guideway and a position in which said mask may be moved to parallel and overlie the section of transparent material on said platen.

2. A photographic printing device as claimed in claim 1, wherein the connecting means between the mask and the base includes a guide member secured to the base and in which guide member the mounting member for the mask is vertically shiftable.

3. A photographic printing device as claimed in claim 1, wherein there are provided a pair of spaced-apart strips secured to said base and providing therebetween the said guideway, and wherein said strips include overlying shelf portions confronting one another and beneath which the film strip is positioned on the base.

4. A photographic printing device as claimed in claim 3, wherein each said shelf portion is provided with a downwardly open longitudinal groove in the undersurface thereof to reduce friction with an inserted film strip.

5. A photographic printing device as claimed in claim 1, wherein there are provided a pair of spaced-apart strips secured to said base and providing therebetween the said guideway, and wherein the said strips have bevelled edges along the entering ends thereof to facilitate feeding of the film strip to the guideway.

References Cited in the file of this patent

UNITED STATES PATENTS

| | | |
|---|---|---|
| 1,570,498 | Kalmanovitch | Jan. 19, 1926 |
| 1,840,307 | Bornmann | Jan. 12, 1932 |
| 2,073,304 | Hopkins | Mar. 9, 1937 |
| 2,204,668 | Eggert | June 18, 1940 |
| 2,205,615 | Busse | June 25, 1940 |
| 2,605,675 | Mourfield | Aug. 5, 1952 |
| 2,686,050 | Zelar | Aug. 10, 1954 |

FOREIGN PATENTS

| | | |
|---|---|---|
| 6,886 | Great Britain | of 1939 |
| 506,589 | Great Britain | May 30, 1939 |
| 916,340 | France | Aug. 19, 1946 |